(No Model.)

E. F. PFLUEGER.
SPOON BAIT.

No. 480,132. Patented Aug. 2, 1892.

Witnesses
Jesse Heller
Phil C. Masi.

Inventor
E. F. Pflueger,
by E. W. Anderson
his Attorney

UNITED STATES PATENT OFFICE.

ERNEST F. PFLUEGER, OF AKRON, OHIO.

SPOON-BAIT.

SPECIFICATION forming part of Letters Patent No. 480,132, dated August 2, 1892.

Application filed April 16, 1892. Serial No. 429,407. (No model.)

*To all whom it may concern:*

Be it known that I, ERNEST F. PFLUEGER, a citizen of the United States, and a resident of Akron, in the county of Summit and State of Ohio, have invented certain new and useful Improvements in Detachable and Reversible Devices for Trolling-Bait; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
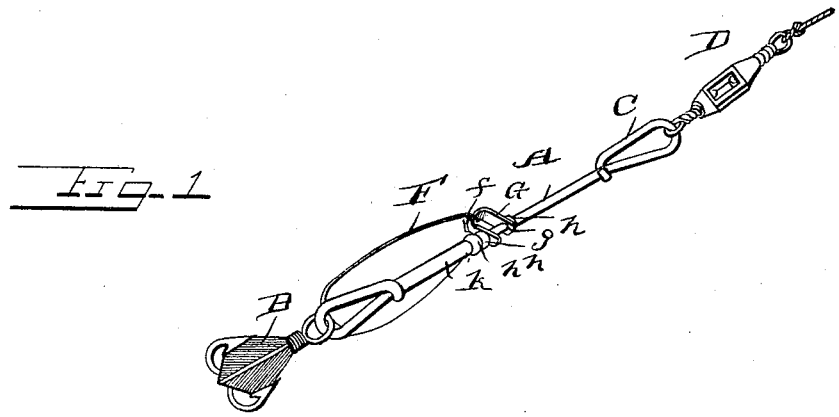
Figure 2:
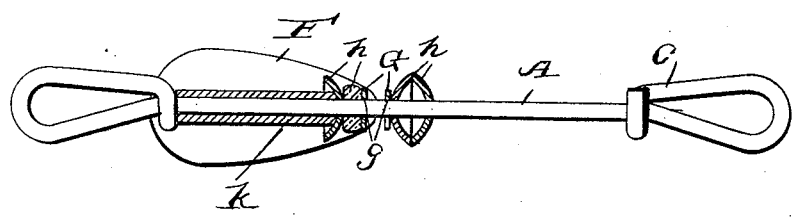

Figure 1 of the drawings is a perspective view of the invention, partly in section. Fig. 2 is a side view of same, partly in section.

This invention has relation to certain new and useful improvements in trolling-spoons, the object being to provide a simple and convenient means for attaching the spoon to the wire, gimp, gut rods or snoods used in trolling; and it consists in the novel construction and combination of parts, all as hereinafter specified.

In the accompanying drawings, the letter A indicates a wire rod, to which the bait B is attached and which at its upper portion is bent back upon itself to form a spring loop-clasp C, to which the line or line-attaching device D is connected in the usual manner.

F designates the spoon, which is of the ordinary well-known form and which at its end is pierced with a small round, square, or oblong hole $f$.

G is the lug or device, by means of which the spoon is connected to the rod or snood and which constitutes the principal feature of the invention. This device consists of a short piece of wire or thin sheet material bent into a bow and pierced at its ends with the registering holes or eyes $g\ g$. The device is passed loosely through the hole $f$ in the spoon and the rod or snood passed loosely through the eyes or holes $g\ g$, whereby the spoon is permitted a free rotation around the rod or snood as it passes through the water.

An elongated sleeve $k$ is usually employed on the rod to keep the spoon at the proper distance above the hooks or bait. Small washers $h$ may also be employed, as shown. By means of this connection it will be apparent that the spoon will normally hang downwardly toward the hook or bait, or at a downward angle to the rod in the usual manner; but that when a fish is hooked it will be free to fall back away from the bait and hook, allowing the fish free play without injuring the lug or the blade in its movements, which often occurs with the ordinary manner of attachment. It will also be apparent that a spoon or other bait may be quickly detached from the rod or snood and a gilt, nickel, silver, or other style bait or spoon attached at will.

I desire it understood that the attachment may be used with any other form of rod or snood than that above described, and illustrated in the drawings, and that any number of spoons or bait may be attached to the rod or snood at pleasure. This will permit the angler to form different combinations of the color by using different styles of spoons or bait, as may be the most effective or desirable at any particular time, without the necessity of changing the line or the use of a different rod or snood.

Having described this invention, what I claim, and desire to secure by Letters Patent, is—

1. The herein-described device for attaching trolling or other bait to a rod or snood, said device comprising a piece of wire or sheet metal bent into bow form and having apertures near each extremity, which loosely engage the rod or snood, substantially as specified.

2. The combination, with a trolling-spoon or other bait having a hole or aperture therein, of a fastening device for attaching said spoon or bait to a rod or snood, said device consisting of a short metal bow loosely engaging said aperture at its central portion and provided with apertures near each end, which loosely engage the rod or snood, substantially as specified.

In testimony whereof I affix my signature in presence of two witnesses.

ERNEST F. PFLUEGER.

Witnesses:
T. W. WAKEMAN,
G. W. A. GALL.